Feb. 15, 1938.                R. W. JOHNSON                2,108,225
                              HEAT REGULATOR
                          Filed Dec. 29, 1933           5 Sheets-Sheet 3
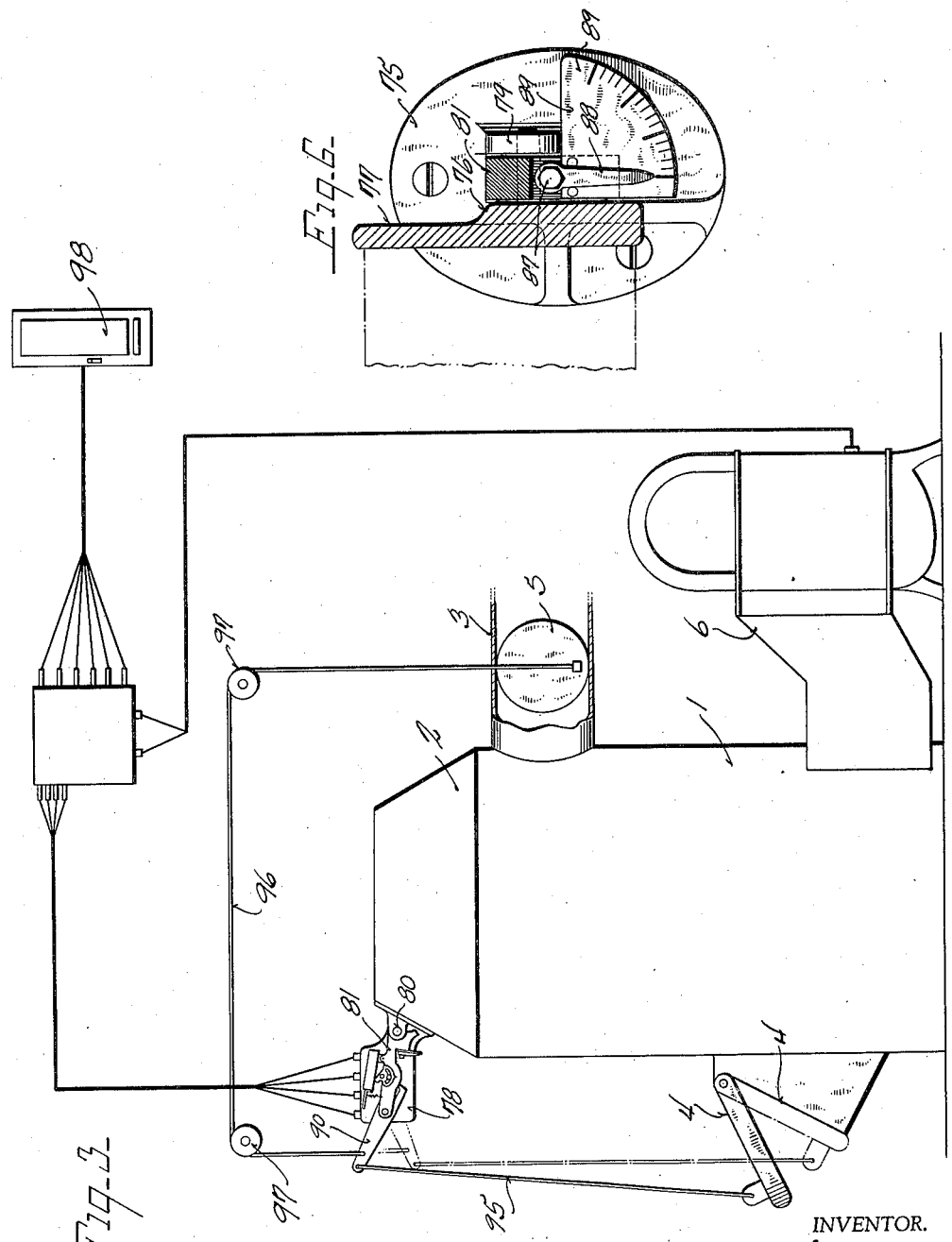
INVENTOR.
Roy N. Johnson
BY
ATTORNEYS

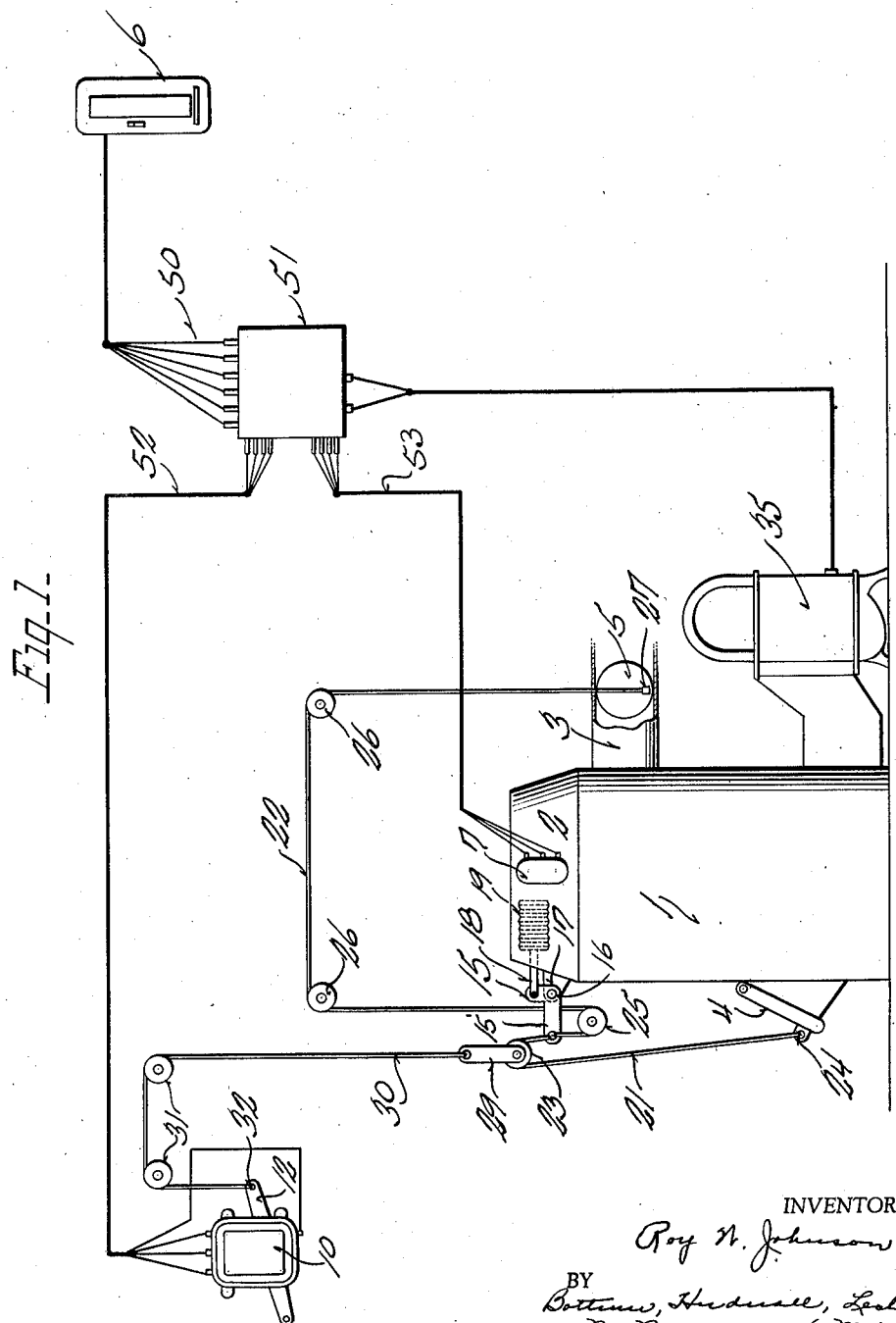

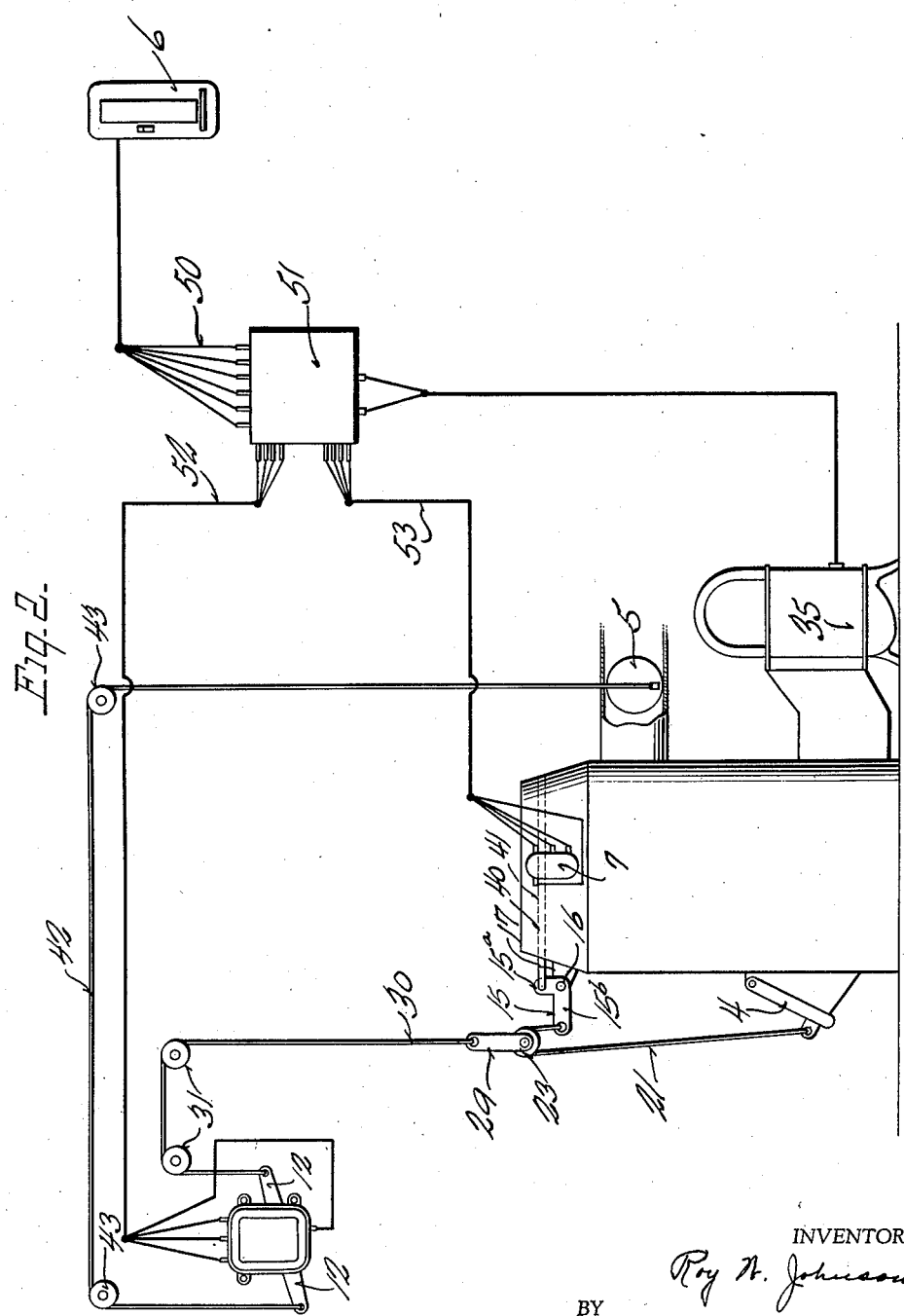

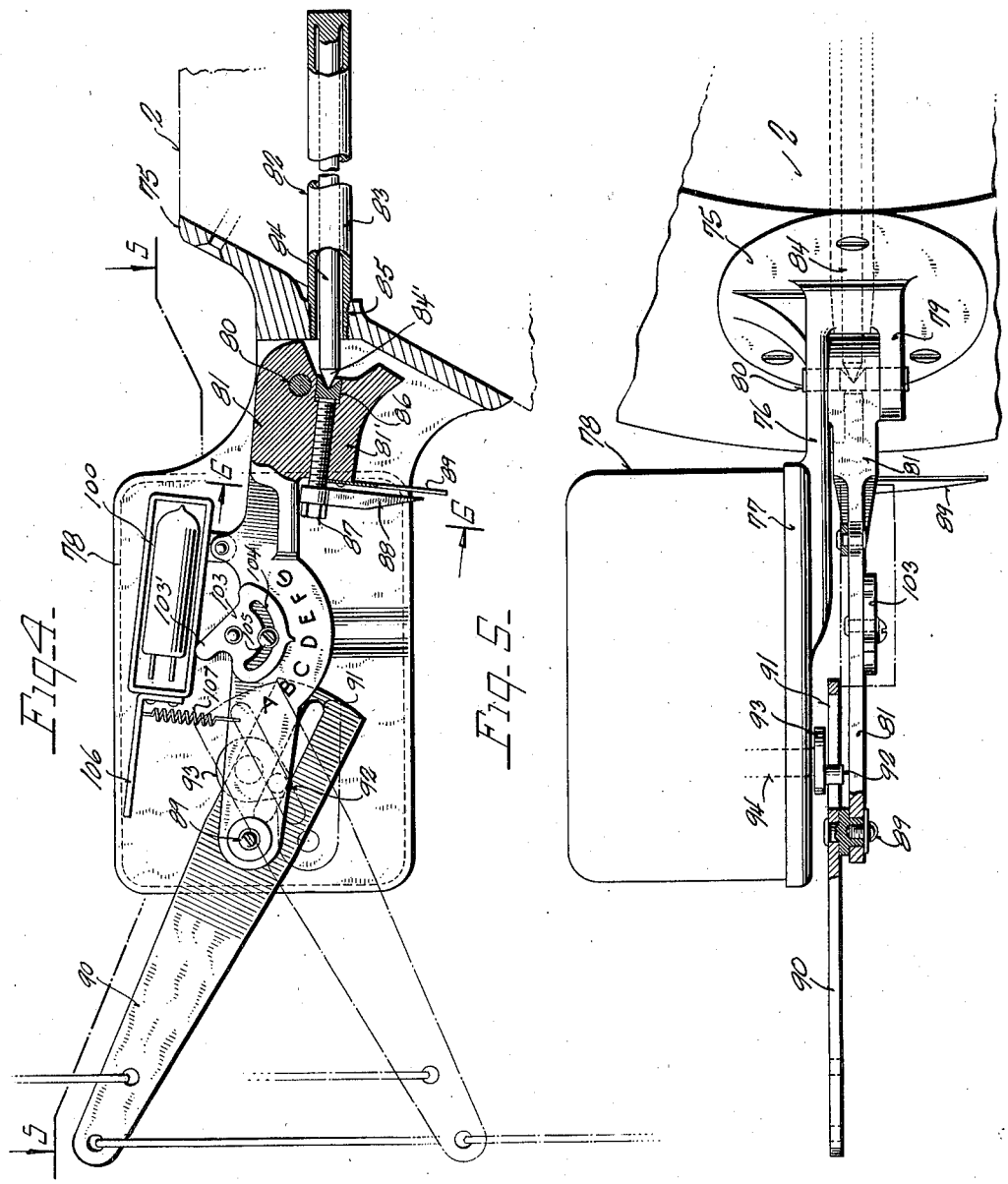

Feb. 15, 1938.　　　　R. W. JOHNSON　　　　2,108,225
HEAT REGULATOR
Filed Dec. 29, 1933　　　5 Sheets-Sheet 5
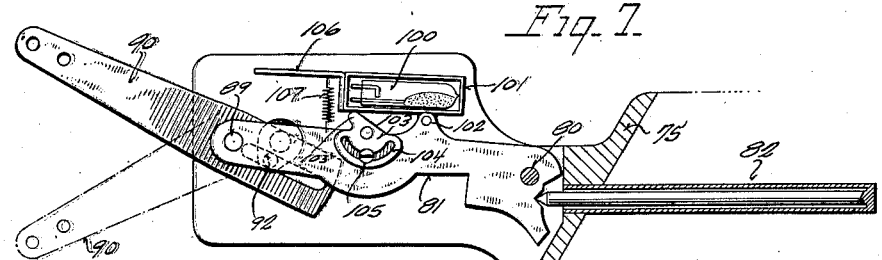
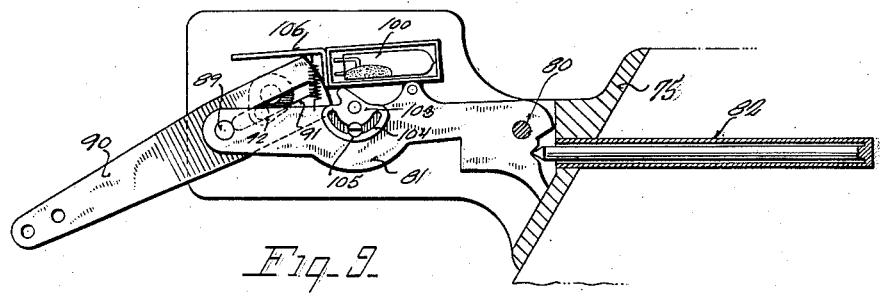
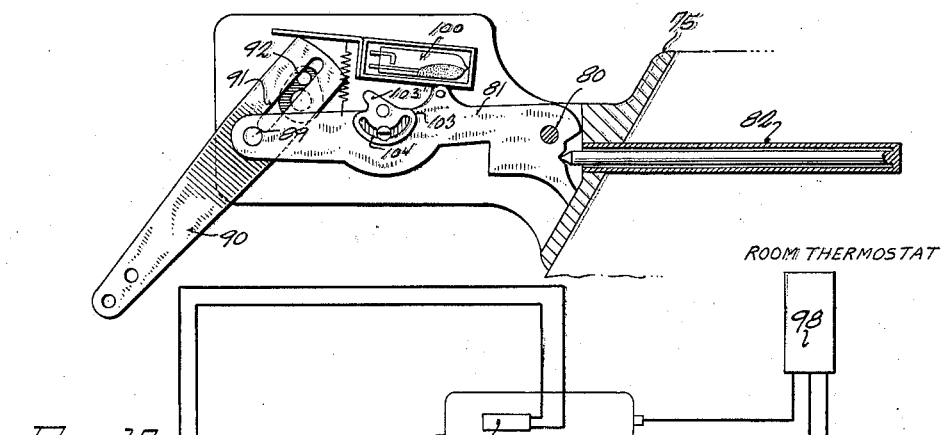
INVENTOR.
Roy N. Johnson
BY
ATTORNEYS Patented Feb. 15, 1938

2,108,225

UNITED STATES PATENT OFFICE 2,108,225

HEAT REGULATOR

Roy W. Johnson, Milwaukee, Wis.

Application December 29, 1933, Serial No. 704,373

9 Claims. (Cl. 236—9)

This invention relates to an improvement in controls for heaters, such as hot air furnaces, hot water heating plants, or the like.

One object of the invention is to provide a control which is more sensitive to conditions obtaining in the heater in that it tends to bring about a moderately sustained condition of combustion and precludes extreme and undesirable acceleration of combustion and consequent waste of fuel.

Another object of the invention is to provide a control of this character which may be readily installed on the heater and combined with the control devices well known and ordinarily used and this with economy and with the assurance of efficient and reliable operation after installation.

In prior devices of this general character applied to a hot air heater for example, the heater is equipped with the usual direct and check draft dampers which are opened and closed by means of cables guided about suitable pulleys and actuated by a damper regulator. The damper regulator is in turn controlled in its action from a room thermostat. Frequently, heaters of this type are provided with a motor operated fan in the cold air inlet to the heater, which fan is automatically turned on and off under the control of a room thermostat and a thermostatic switch arrangement responsive to temperatures within the heater. With such an arrangement when the room thermostat calls for heat and the rate of combustion in the heater is relatively slow so that the heater temperature is low then the damper regulator is actuated to open the direct draft damper and close the check draft damper whereby to accelerate combustion within the heater. As a consequence, the temperature within the heater rises and when it reaches a predetermined point the fan is automatically turned on to blow the hot air up into the room or rooms to be heated. This reduces the heater temperature although combustion is still being accelerated and the fan is then automatically shut off. The on and off periods of the fan progressively vary but during all this time, the room thermostat, not being satisfied, combustion in the heater is being accelerated. If the demand of the room thermostat for heat obtains over a protracted period the temperature within the heater finally reaches the highest limit consistent with safety and in such event the thermostatic switch arrangement which normally controls the operation of the fan then causes the damper regulator to operate to move the dampers to the position in which to check combustion. A similar action is also had in installations where the fan is omitted and is carried out under the influence of a high limit safety switch operated by a thermostat subjected to the temperature within the heater. Even where the period during which the room thermostat calls for heat is not unduly prolonged there is during the entire period an acceleration of combustion in the heater and as a consequence the combustion is proceeding at an unnecessarily accelerated rate when the room thermostat is satisfied.

The present invention proposes generally to avoid this unnecessary acceleration of combustion and to moderate the rate of combustion thereby saving fuel, avoiding waste and better co-ordinating the action of the damper regulator and fan. This is accomplished by opening and closing the dampers with a sort of a floating action within a certain range of temperatures in the heater.

In one embodiment of the invention a thermostat of some suitable type is subjected to the action of the temperature within the heater and it is operatively related with the cables connecting the damper regulator and the dampers so that it opens and closes the dampers irrespective of the damper regulator thereby retarding combustion even though the damper regulator is set to require the direct draft damper open and the check draft damper closed. The action is flexible and graduated, however, and obtains a nice regulation over the rate at which combustion is accelerated.

In another and in many instances of the preferred embodiment of the invention the damper regulator is as before regulated in its immediate action by the room thermostat whereas the effective action of the regulator on the dampers is determined by a thermostat responsive to thermal conditions in the furnace. In this second embodiment, however, the modifying action of the furnace or heater thermostat is exerted on the operating lever of the damper regulator rather than directly on the cables or other means connecting such lever with the dampers. Such modifying action may be conveniently exerted by appropriately shifting the fulcrum of the operating lever under the influence of the heater thermostat and so connecting the operating lever up with the damper regulator that such shifting is permitted and will result in the desired modification in the rate of combustion.

The invention also contemplates combining with this means for regulating the rate of combustion additional means for regulating the rate of supply of a heat conducting medium. For example, in a hot air furnace a furnace fan driven by an electric motor may be provided, the electric motor being started and stopped under the control of an electric switch, such as a mercury switch. The switch in turn is opened and closed under the influence of this heater thermostat and the heater and room thermostat. Thus, the mercury switch may be pivotally mounted on a part rocked by the heater thermostat so as to be tipped to closed position when the furnace temperature exceeds a predetermined value and moved back to open position when such temperature drops to a selected point.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a diagrammatic view in side elevation illustrating one embodiment of the invention;

Figure 2 is a similar view showing another embodiment of the invention;

Figure 3 is a diagrammatic view in side elevation showing another embodiment of the invention;

Figure 4 is a view partly in elevation and partly in vertical section showing the draft regulator and associated instrumentalities of the embodiment generally disclosed in Figure 3;

Figure 5 is a plan view of the parts illustrated in Figure 6;

Figure 6 is a fragmentary view in section taken on line 6—6 of Figure 4;

Figures 7, 8, and 9 are views partly in side elevation and partly in section and illustrating the various positions of the instrumentalities illustrated in Figure 4; and Figure 10 is a diagrammatic view illustrating generally one way in which the instrumentalities of the embodiment illustrated in Figures 3 to 9 may be electrically connected.

Referring to the drawings, and more particularly to Figures 1 and 2, it will be seen that in these embodiments of the invention the numeral 1 designates a heater which, for the sake of illustration, is shown as a hot air furnace. The heater 1 has the usual hood 2 at its upper end and also a stack pipe 3 leading off to a chimney or the like (not shown). A direct draft damper 4 and a check draft damper 5 of conventional construction are provided on the heater. The direct and check draft dampers are opened and closed under the influence of a conventional room thermostat 6 and a furnace fan control thermostat 7 which are electrically interconnected in any suitable manner and which regulate the energization of the electric motor of a conventional draft regulator 10. Usually, the operating arms 12 of the regulator 10 are connected to the direct and check draft dampers through cables or similar flexible elements. The present invention interposes between the draft regulator and one or both of the dampers a thermostatically controlled damper operator, the thermostat of which is subject to the heat of the furnace or heater so that the action of one or both dampers as determined by the damper regulator is modified by the heater thermostat.

In the form of the invention shown in Figure 1, a bell crank 15 is fulcrumed at its elbow on a pivot pin 16 carried by a bracket 17 fastened to the furnace. One arm of this bell crank 15 is pivotally connected to one end of an operating rod 18, which rod extends in through an opening provided therefor in the hood of the furnace and is operatively connected to and actuated by a bellows type thermostat designated at 19. Cables 21 and 22 are connected to the other arm of this bell crank, the cable 21 extending upwardly from said arm and over a pulley 23 and then down to the direct draft damper 4 to which it is secured as indicated at 24. The other cable 22 extends downwardly from the arm 15' of the bell crank 15 and then around a guide pulley 25 and up, over and around guide pulleys 26 and down to the check draft damper 5 to which it is operatively connected as indicated diagrammatically at 27. The guide pulleys 25 and 26 are rotatable about fixed axes.

The pulley 23 is the operating pulley and is suspended by means of a hanger 29 from a cable 30 which extends up, over and around guide pulleys 31 also rotatable about fixed axes and then down to one of the arms 12 of the draft regulator to which it is connected as indicated at 32.

The furnace may be equipped with a blower fan or air conditioner designated at 35 and operatively connected in the system in the usual way.

With a control of this character, the room thermostat and the furnace fan control switches act to operate the damper regulator to shift the direct and check draft dampers to either one of their two positions accordingly as conditions require acceleration or slowing down of combustion within the heater. With the present invention, however, an added nicety of control is had for the reason that the heater thermostat 19, responding as it does to thermal conditions within the furnace, swings the bell crank 15 back and forth to thereby vary the extent to which the direct and check draft dampers are opened. This bell crank 15 has a floating action and is operating almost continuously to maintain a moderate and sustained combustion within the heater.

In the form of the invention shown in Figure 2, the bell crank 15 is also provided and is pivotally mounted as before on a pin 16 carried by a bracket 17. Its arm 15ª is also connected to a rod 40 of a rod type thermostat designated at 41 and located within the hood. In this form of the invention, however, the thermostatically controlled bell crank operates merely to modify the action of the direct draft damper 4, the check draft damper 5 being directly controlled from one of the arms 12 of the draft regulator by means of a cable 42 passing over guide pulleys 43 and operatively connected to the check draft damper. The direct draft damper is opened and closed from the arm 15ᵇ of the bell crank as before, it being connected to one end of the cable 20 which passes over and around the operating pulley 23 suspended by the hanger 29 to the cable 30 which extends over the idler pulleys 31 and is connected up to one of the arms 12 of the draft regulator. In this form of the invention the thermostatically controlled bell crank operates with a floating action to open and close the direct draft damper in response to variations in the thermal conditions within the furnace.

In Figures 1 and 2, the room thermostat is shown as wired as at 50 to a control box 51 which, in turn, is wired as at 52 and 53 to the damper regulator and to the thermostat arrangement 7. The electrical system employed is conventional and needs no detailed explanation here as it is well known to those skilled in the art and per se forms no part of this invention.

In the embodiment illustrated in Figures 3 to 10, inclusive, the invention is also shown applied to a heater 1 having the usual hood 2, stack pipe 3, direct and check draft dampers 4 and 5, and air conditioner or furnace fan 6.

In this embodiment of the invention, a bracket 75 is fastened directly onto the hood 2. One arm 76 of this bracket 75 may be integral with the cover plate 77 of the casing of the damper regulator 78. Paralleling the arm 76 is a short arm 75

79 which, like the arm 76, is apertured to provide a support for a pivot pin 80, on which a mounting lever 81 is fulcrumed. The position of this mounting lever 81 is controlled and regulated by a heater thermostat designated generally at 82 and made up of a tube 83 having an appropriate coefficient of expansion and an inner rod 84. One end of the tube is threaded or otherwise secured as at 85 to the bracket and from the bracket the tube extends into the interior of the hood of the heater. The inner end of the tube is closed and may be integrally or otherwise fixedly connected to the rod 84. The outer end of this rod 84 is beveled as at 84' and bears against a recessed seat 86 disposed in an opening provided therefor in an offset portion 81' of the lever 81 and controlled as to its position by means of a stud or screw 87. Fixed on the screw 87 adjacent its head is a pointer 88 which traverses a dial 89 fastened to the portion 81' of the lever 81. By adjusting the stud 87 the extent to which the lever 81 is rocked under the influence of the thermostat 82 may be varied and consequently the responsiveness of the device to heater temperatures may be controlled as will hereinafter more clearly appear.

A pivotal connection 89 is provided between the outer end of the mounting lever 81 and an intermediate portion of an operating lever 90. The inner portion of this lever 90 is provided with a longitudinal slot 91 in which a crank pin 92 is operatively fitted. This pin 92 is secured to and disposed eccentrically of a crank or cheek plate 93 fixed to the outer end of a shaft 94 which is driven from the electric motor (not shown) of the damper regulator in the usual way or in any desired way. It will be understood that these damper regulators are well known and widely used and hence the detailed description thereof is unnecessary.

The outer end of the operating lever 90 is provided with spaced openings to adapt it to be secured to cables 95 and 96, the cable 95 leading to and being connected with the direct draft damper 4 and the cable 96 being trained over pulleys 97 and suitably connected to the check draft damper 5.

The damper regulator 78 has its electric motor controlled in the usual way from the room thermostat 98. It will be understood that when the room thermostat calls for heat it completes the circuit through the motor of the damper regulator to cause the motor to rotate the crank pin 92 to its lower position, that is, to the position shown in Figures 4, 7, and 8, thereby swinging the lever 90 in a clockwise direction, elevating its outer end and tending to cause the opening of the direct draft damper 4 and the closing of the check draft damper 5.

With the construction as thus far described, when the room thermostat calls for heat and the furnace is cold the operation of the damper regulator and the consequent upward swinging of the outer end of the lever 90 will effect opening of the direct draft damper 4 and closing of the check draft damper 5, since, under such conditions, the mounting lever 81 has its outer end in its upper position due to the fact that the furnace being cold the thermostat 82 is contracted. With the thermostat 82 cold and contracted its rod 84 projects to a greater distance beyond the bracket and furnace than it does when the thermostat is hot and consequently it rocks the mounting lever 81 about its pivot 80 in a clockwise direction to elevate the outer end of the mounting lever and consequently raise the fulcrum for the operating lever. Opening of the direct draft damper 4 and closing of the check draft damper 5 accelerates combustion in the heater. When the temperature in the heater rises to a predetermined point the thermostat 82 has been so heated up and consequently so expanded as to withdraw the outer end of the rod 84 inwardly to the furnace thereby lowering the outer end of the mounting lever and rocking the operating lever 90 downwardly about its crank pin 92, to the position shown in Figure 8, thereby moving the direct draft damper 4 toward closed position and the check draft damper 5 towards open position to slow up the rate of combustion and prevent undue acceleration thereof. With the room thermostat still calling for heat and with the dampers adjusted as just described, the furnace tends to cool off and there is reversal of the action and another acceleration of combustion. This series of operations is repeated, that is, there is a sort of floating action of the dampers 4 and 5 from one position to another to bring about a sustained and moderate acceleration of combustion.

In many instances, it is desirable to employ a furnace fan, an air conditioner or other means for positively insuring a supply or circulation of the heat conducting medium and where a furnace fan or such means is employed its action is co-ordinated with that of the instrumentalities just described. This may be conveniently effected by utilizing a switch to control the making and breaking of the circuit for the motor which drives the fan. As illustrated in the drawings, a mercury switch designated at 100 may be employed, and may be conveniently mounted in a holder 101, pivotally supported as at 102 on the mounting lever 81. The position of the holder 101 and the switch 100 is controlled by an adjustable support 103 pivoted on the lever 81 and having a projection 103' engageable with the holder 101. The support 103 is provided with an arcuate slot 104 with which a clamping screw 105 coacts to secure the support in adjusted position. An angle bracket 106 is secured to one end of the holder. A spring 107 between this bracket 106 and the lever 81 yieldably maintains the holder in engagement with its support 103.

With the switch mounted in the manner described and connected in controlling relation to the circuit of the fan motor 110 as shown in Figure 10, the body of mercury in the switch does not bridge the electrodes thereof when the furnace is cold since at such time the switch is tipped in the manner illustrated in Figure 7. When, however, the furnace heats up and the lever 81 rocks downwardly about its pivot 80 the switch is tilted over to cause the mercury to flow into bridging relation with the electrodes of the switch, thereby closing the switch as illustrated in Figure 8 and completing the fan motor circuit to start up the fan. This action occurs only if the room thermostat is calling for heat and consequently has caused the damper regulator to tend to rock the operating lever 90 upwardly. Even if the furnace is heated up and the room thermostat becomes satisfied and consequently operates the regulator to rock the lever 90 downwardly in the manner illustrated in Figure 9, then the inner end of the lever 90 wipes against the bracket 106 and tilts the switch 100 back to its open position, as illustrated in Figure 9.

While I have shown and described typical embodiments of the invention, it is to be understood that the structures shown have been selected merely for the sake of illustration or example and that various changes may be made in the size, shape and arrangement, as will be obvious to those skilled in the art, without departing from the spirit of the invention or the scope of the subjoined claims.

The invention claimed is:

1. A control for a heater comprising means for regulating the rate of combustion, a room thermostat controlling the action of said means, a heater thermostat subject to the temperature of the heater and mechanically connected to said means for modifying the action thereof in response to the room thermostat in combination with means for controlling the rate of supply of a heat conducting medium, and a control element for said last named means shifted to one position under the influence of said heater thermostat and to another position under the influence of said heater thermostat and said room thermostat.

2. In a control device for heaters, means for controlling the rate of combustion including a shiftable operating member, a motor for shifting said member, a room thermostat regulating the action of said motor, a thermostat responsive to thermal conditions in said heater and operatively inter-related with said member for modifying the action thereof, in combination with means for controlling the rate of supply of a heat conducting medium and a control element for said last-named means operated under the influence of said heater thermostat and said member.

3. In a control device for heaters, means for controlling the rate of combustion including a shiftable operating member, a motor for shifting said member, a room thermostat regulating the action of said motor, a thermostat responsive to thermal conditions in said heater and operatively inter-related with said member for modifying the action thereof, in combination with means for controlling the rate of supply of a heat conducting medium, an electric motor for operating said last-named means, and a control switch for said electric motor closed under the influence of said heater thermostat and opened under the influence of said heater thermostat and said shiftable member.

4. A control for a heater having a damper and comprising an operating lever connected to said damper, a damper regulator connected to said lever to cause the same to open and close the damper, a room thermostat regulating the action of said damper regulator, a second lever supported for swinging movement and pivotally interconnected with the operating lever to provide a shiftable fulcrum therefor and to modify the position thereof relative to said regulator, and a thermostat subjected to the temperature of the heater and engaged with the second lever to shift the same in one direction to cause movement of the damper to opened and closed position when the heater temperature reaches a predetermined value and to also shift the same in an opposite direction to cause the damper to move toward open position when the heater temperature falls below a predetermined value when said regulator has so moved the operating lever as to open said damper.

5. In a control device for heaters having dampers, a bracket adapted to be secured to the hood of a heater, an operating lever adapted to be connected to the dampers of the heater, a second lever pivotally supported on said bracket and having a pivotal connection with said operating lever to provide a shiftable fulcrum therefor, a motor mounted on said bracket, a crank pin driven from said motor, said operating lever having a slot in which said crank pin is operatively fitted and a tube and rod type thermostat carried by said bracket and adapted to be subjected to the thermal conditions within the heater, said second lever having a portion offset from its fulcrum with which said rod is engaged to control the position of the second lever.

6. A control device for a heater having a damper and comprising an operating lever adapted to be connected to the damper, a pivotally supported mounting lever having a pivotal connection with the operating lever to provide a shiftable fulcrum therefor, a power driven crank pin, said operating lever having a slot in which said crank pin is operatively fitted, and a thermostat subjected to the temperature of the heater and interconnected with said mounting lever to shift the same in accordance with temperature variations in said heater.

7. A control device for a heater having a damper and comprising an operating lever adapted to be connected to the damper, a pivotally supported mounting lever having a pivotal connection with the operating lever to provide a shiftable fulcrum therefor, a power driven crank pin, a room thermostat controlling the actuation of said power driven crank pin, said operating lever having a slot in which said crank pin is operatively fitted, and a thermostat subjected to the temperature of the heater and interconnected with said mounting lever to shift the same in accordance with temperature variations in said heater.

8. A control device for a heater having a damper and comprising an operating lever adapted to be connected to the damper, a pivotally supported mounting lever having a pivotal connection with the operating lever to provide a shiftable fulcrum therefor, a damper regulator interconnected with the operating lever for shifting the same, an adjustable abutment carried by the mounting lever eccentric to the axis of its pivotal mounting, and a thermostat subjected to the temperature of the heater and having a movable element engageable with said adjustable abutment.

9. A control device for a heater having a damper and comprising a damper regulator, a thermostat controlling the action of the damper regulator, a two-part cable connection between said damper regulator and said damper, one of said parts carrying a pulley, the other cable part being looped about the pulley, a lever pivotally mounted on the heater and having one arm connected to the cable part looped about the pulley, and a thermo-responsive device subjected to the temperature within the heater and having an element movable back and forth in response to temperature changes in the heater and connected to another arm of said lever, whereby said movable element of the thermo-responsive device adjusts the position of the damper toward and from that position at which the damper regulator tends to set it whereby to graduate and dampen changes in the rate of combustion in the heater.

ROY W. JOHNSON.